United States Patent [19]

Nagayama

[11] 4,077,647
[45] Mar. 7, 1978

[54] RIDABLE AMUSEMENT DEVICE

[75] Inventor: Yutaka Nagayama, Kishiwada, Japan

[73] Assignee: Nagayama Electronic Industry Co., Ltd., Kishiwada, Japan

[21] Appl. No.: 709,517

[22] Filed: Jul. 28, 1976

[51] Int. Cl.² ............................................. B62M 1/14
[52] U.S. Cl. .................................. 280/211; 280/242 R
[58] Field of Search ........... 280/211, 224, 225, 242 R, 280/242 WC, 249, 259, 289 S; 296/78.1, 147

[56] References Cited

U.S. PATENT DOCUMENTS

| 71,562 | 11/1867 | Way | 280/242 R |
|---|---|---|---|
| 2,869,686 | 1/1959 | Glanz | 280/242 WC |
| 3,450,416 | 6/1969 | Mulder | 280/211 |
| 3,820,790 | 6/1974 | Peterson | 280/211 X |
| 3,979,147 | 9/1976 | Kelley | 296/78.1 |

Primary Examiner—Philip Goodman
Assistant Examiner—Terrance L. Siemens
Attorney, Agent, or Firm—Birch, Stewart, Kolasch & Birch

[57] ABSTRACT

There is disclosed a wheeled type ridable amusement device adapted to be driven and steered by man power, comprising a frame constructed of a metal or synthetic resin pipe shaped into an annular form, two opposed main wheels mutually independently and rotatably mounted on opposite sides of the frame, handles for independently manually driving the respective main wheels for rotation, a seat with its backrest secured to the rear region of the frame, a footrest disposed in the front region of the frame in front of the seat with a predetermined space defined therebetween, and a small swiveled auxiliary wheel.

36 Claims, 9 Drawing Figures

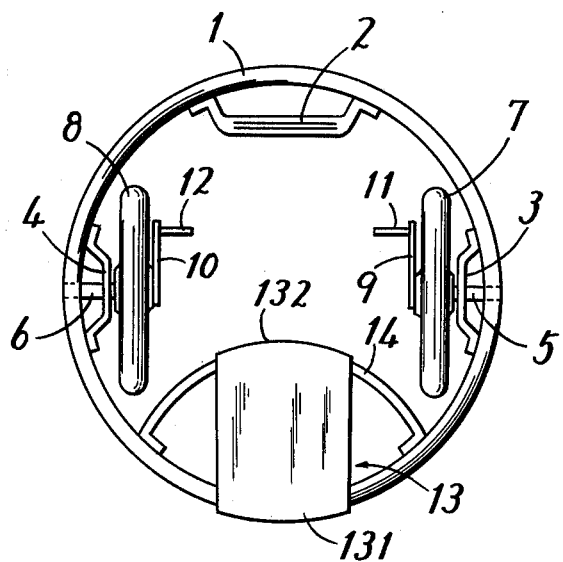
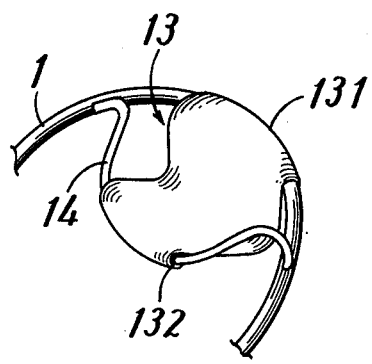
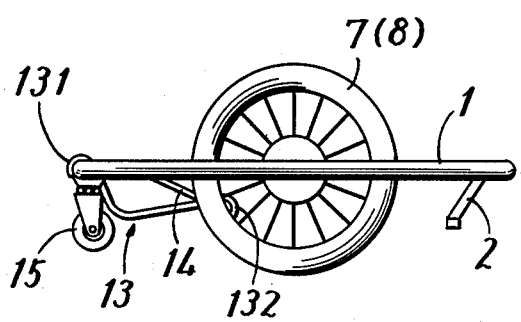
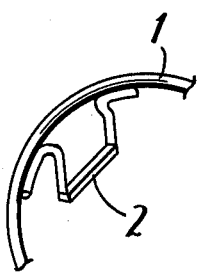
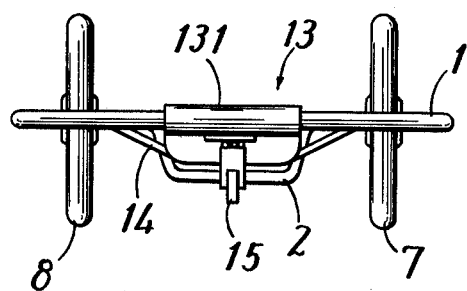

RIDABLE AMUSEMENT DEVICE

BACKGROUND OF THE INVENTION

1. Field of the Invention

The present invention relates to a ridable amusement device, and more particularly it relates to a wheeled type ridable amusement device adapted to be driven and steered by the hands of a person, especially a child.

2. Description of the Prior Art

Man's desire for amusements is believed to be quite intrinsic. Various techniques are being developed in various field of industry and they add to the abundance of the existing techniques to provide amusement devices. Further, amusement devices are more popular since the average level of the consumer is improving. This situation stimulates the toy industry to create new amusement devices. It is certain that such amusement devices will quickly move toward diversification. Further, there is a trend for consumers to take interest in novel amusement devices, and they will probably welcome the diversification of amusement devices.

Vehicles have heretofore been introduced into the field of amusement devices. Particularly for childrens use, a typical example of an amusement device is a tricycle. Further, there are other vehicles after for children which are designed in the style of locomotives, electric cars, automobiles, etc.

Wheeled type ridable amusement devices such as those described above are useful for developing motor nerve and physical strength. However, when the amusement device is for a child, priority should be given to safety. It is also necessary that such devices be light-weight and hence simple in construction. Being an inexpensive device which is readily attainable by the consumer is of great significance. Such configurations and motions as will be of interest to people and appeal to their modern sense so as to command popularity will be another important consideration which cannot be overlooked. Conventional ridable amusement devices, however, do not necessarily meet all of the above requirements. Particularly, the ability to command popularity is difficult to achieve since popularity has a multifarious nature and is inconstant and fluid. In order to meet the above requirements, it is believed that there is no alternative but to create a novel ridable amusement device.

SUMMARY OF THE INVENTION

The present invention provides a ridable amusement device which is capable of meeting the various desires described above.

A ridable amusement device according to the present invention comprises an annular frame, two main wheels with their respective axles aligned with each other, driving handles, a seat, a footrest, and a swiveled auxiliary wheel. The main wheels are mounted on opposite sides of the frame with their axles supported at lateral positions and are rotatable independently of each other. The driving handles are associated respectively with the main wheels to allow the operator to independently drive the main wheels with his hands. The seat is disposed in the rear region of the frame and has a backrest. A predetermined space is defined forwardly of the seat and the footrest is disposed in the front region of the frame. The swiveled auxiliary wheel has its axis supported at the rear of the frame.

The ridable amusement device of the present invention is driven and steered by a person who sits on the seat with his feet resting on the footrest. More specifically, he grips the driving handles with his hands and drives the two main wheels independently. If the two main wheels are driven at the same speed, a forward or backward rectilinear motion is obtained. If they are driven at different speeds, a leftward or rightward curvilinear motion is attained. Further, if the left-hand side main wheel is driven in one direction and the right-hand side main wheel in the other direction, then the vehicle can be turned around a fixed point. Such motions are one of the important features of the ridable amusement device of the present invention.

Accordingly, a principal object of the present invention is to provide a ridable amusement device which interests people in terms of artistic design and motion and appeals to their modern sense.

Another object of the present invention is to provide a ridable amusement device which is superior in safety.

A further object of the present invention is to provide a ridable amusement device which is light-weight and simple in construction and can be produced at low cost.

An additional object of the invention is to provide a ridable amusement device which is capable of advantageously developing motor nerve and physical strength of the individual operating the amusement device.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a view for explanation of the top arrangement of an embodiment of the invention;

FIG. 2 is a view for explanation of the side arrangement of the embodiment shown in FIG. 1;

FIG. 3 is a view for explanation of the back arrangement of the embodiment shown in FIG. 1;

FIG. 4 is a fragmentary view for explanation of a seat included in the embodiment shown in FIG. 1;

FIG. 5 is a fragmentary view for explanation of a footrest included in the embodiment shown in FIG. 1;

DESCRIPTION OF THE PREFERRED EMBODIMENTS

Figure 6:
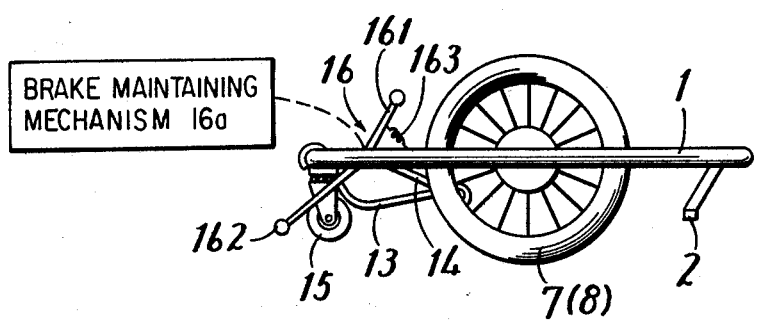
FIG. 6 is a side view for explanation of another embodiment of the invention.

Referring to FIGS. 1–5 showing an embodiment of a ridable amusement device of the present invention, a pipe made of metal or synthetic resin is shaped into an annular form to provide a frame 1, inside which all the other components are mounted. Brackets 3 and 4 are mounted on the inner side of the frame at diametrically opposite positions to support axles 5 and 6, respectively. The axles 5 and 6 are aligned with each other. Mounted on the proximal ends of the axles 5 and 6 supported in the brackets 3 and 4 are main wheels 7 and 8 whose inner sides are provided with inwardly projecting driving handles 11 and 12 carried on crank arms 9 and 10 secured to the main wheels, respectively. In the front region of the frame 1, an inwardly downwardly inclined footrest 2 is fixed to the frame 1. A seat 13 is provided in the rear region of the frame 1. The seat 13 has a backrest 131 secured to the frame 1 and a seat end 132 secured to a crosspiece 14 bridging the frame 1. Below the seat 13, a caster-like auxiliary wheel 15 is attached to the rear region of the frame 1 through a suitable pivot. In the ridable amusement device constructed in the manner described above, a space is defined between the seat 13 and the footrest 2. Further, the crosspiece 14 serves not only to fix the seat 13 in position but also to provide a handrail.

The method of operating this ridable amusement device is as follows.

A person who wants to operate the device can freely step into the space defined between the footrest 2 and the seat 13 of the frame 1 in order to sit on the seat 13. He then sits down on the seat 13, with his feet resting on the footrest 2 and his hands grasping the handles 11 and 12. He is thus positioned in an orientation similar to that of an individual rowing a boat. When it is desired to drive forward, the main wheels 7 and 8 may be forwardly rotated with the handles 11 and 12, while backward drive can be attained by backwardly rotating the main wheels 7 and 8. As for negotiating a right-turn or left-turn, this can be accomplished by rotating the main wheels 7 and 8 at different speeds since the device will make a turn toward the main wheel which is rotating at the slower speed. Further, if the righ-hand side main wheel 7 is rotated in one direction and the left-hand side main wheel 8 in the other direction, then the device can be turned around a fixed point. Particularly for such fixed-point turning, the swiveled auxiliary wheel 15 works advantageously. In the above described modes of drive, with the person seated the frame 1 is kept rearwardly downwardly inclined to some extent, so that stabilized 3-point engagement with the ground is maintained. Further, the center of gravity is located always rearwardly of the axles 5 and 6 and at a lower position, thus enabling the vehicle to be driven with satisfactory stability. Further, the space defined in the middle of the interior of the frame 1 assists the operator in getting on and off and facilitates manual operation.

In the above embodiment, the main wheels 7 and 8 are shown with their centers located on a diameter of the frame 1, but the stability will not be effected even if they are slightly shifted toward the footrest 2.

FIG. 6 shows another embodiment of the invention. The embodiment to be described here is designed to further improve safety. In FIG. 6, the parts which correspond to those shown in FIG. 2 are given like reference characters, and a description thereof is omitted. This embodiment is the same as the preceding one except for the following features.

In the vicinity of the seat 13, a brake device 16 is provided at a position such that the rider can easily operate it by hand. The brake device 16 includes a lever 161 which is pivoted on the frame 1 at a suitable position and adapted to be turned by manual operation. The lower end of the lever 161 terminates in a brake shoe 162 for rubbing against a road to exert a braking force. In order to assure that no braking action will be produced when it is not desired to operate the lever 161, the latter is urged in a clockwise direction (as viewed in FIG. 6) by a means such as a spring 163.

The brake device is not limited to the construction described in the above embodiment, and it may be constructed in such a manner as to produce braking actions on the main wheels 7 and 8. Further, the brake device may be so designed that it is operated by foot rather than by hand or that it is operated both by hand and by foot. Further, it may incorporate a mechanism 16a for maintaining the braked condition, such a mechanism would be effective to prevent accidental self-running and particularly advantageous when the ridable amusement device is positioned on a slope.

Figure 8:
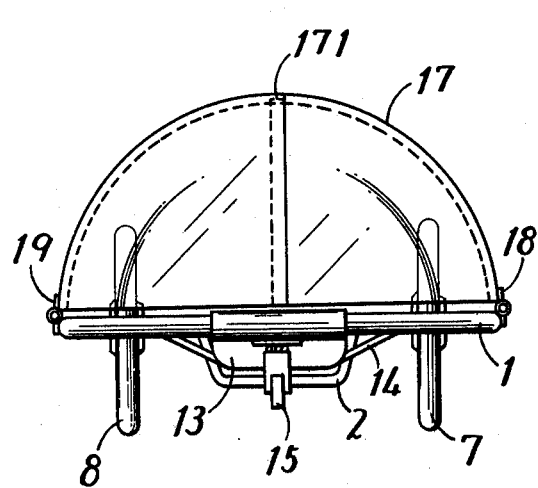
FIG. 8 is a view for explanation of the back arrangement of the embodiment shown in FIG. 7.
Figure 7:
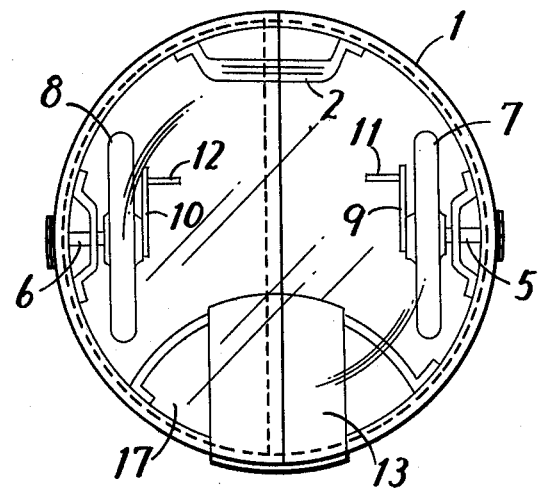
FIG. 7 is a view showing a further embodiment of the invention, explaining the top arrangement thereof.
Figure 9:
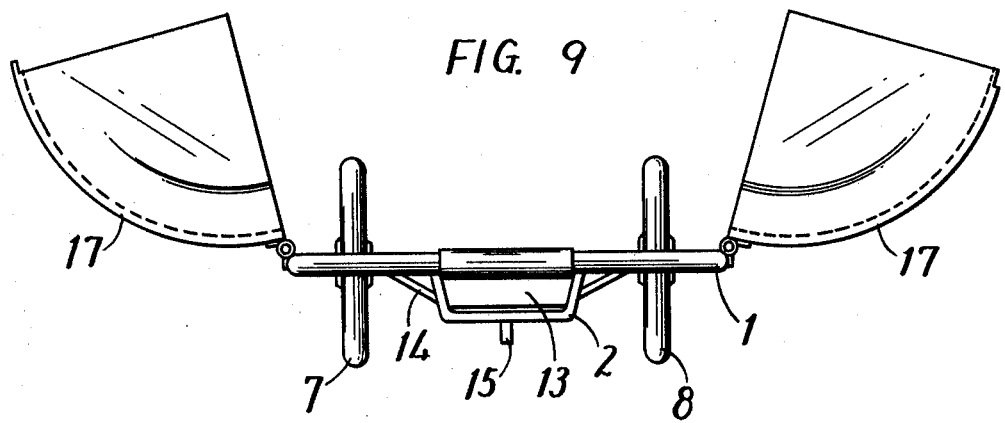
FIG. 9 is a front view of the arrangement of the embodiment shown in FIG. 7.

FIGS. 7 through 9 show a further embodiment of the invention. The embodiment described here is interesting in terms of artistic design and function. In FIGS. 7 through 9, those parts which correspond to those shown in FIGS. 1 through 3 are given like reference characters, and a description thereof is omitted. This embodiment is the same as the one described with reference to FIGS. 1 through 5, except for the following features.

A hemispherical roof or canopy 17 is provided over the frame 1. The canopy 17 is formed of a transparent material and bisected by a longitudinally extending divisional plane. The division has an overlap portion 171 where the two halves are fitted together. The halves are pivoted on opposite sides of the frame 1 by hinges 18 and 19, respectively. Therefore, the canopy 17 is capable of assuming an opened position shown in FIG. 9. This opened position allows the operator to get on and off, and with the canopy 17 in the closed position the vehicle is in the operational condition.

The provision of such hemispherical roof 17 gives the ridable amusement device an image-change feature which is interesting in terms of artistic design and which resembles an artificial satellite and is believed to command popularity particularly among children. Further, since the roof 17 is formed of a transparent material an individual can readily see inside the roof 17 and it will be a great advantage that the person inside can see outside and thus command a wide view.

As another embodiment provided with a roof as in the preceding embodiment, it is to be mentioned that rather than forming the whole roof of a transparent material, only the portion of the roof that is necessary to the driver's field of view may be formed of a transparent material. As for the way the roof is opened, various changes may be made, provided that a person can get on and off the vehicle without difficulty. In this sense, it would be possible to provide sectors in the lateral region or mount a roof so that it can be totally removed. The shape of the roof is not limited to a hemisphere. Further, rather than covering the whole vehicle, the shape of the roof may be such that it covers at least the driver.

In the above embodiments, if the roof is utilized, direction indicators, an alarm, a tail lamp, a head lamp and other attachments can be advantageously mounted.

According to the embodiment provided with the roof as described above, the roof not only affords protection against rain and wind but also serves as a protector against falling objects, thus increasing safety.

Various modifications of the ridable amusement device of the present invention could be made. Accordingly, the preferred embodiments of the invention are only exemplary, and it is to be understood that the scope of the invention and all such modifications as would be obvious to one skilled in this are are intended to be included within the scope of the following claims.

What is claimed is:

1. A ridable amusement device comprising:
   an annular frame;
   mutually independent rotatable main wheels disposed on opposite sides of said frame including axles which are aligned with each other;
   handles associated respectively with said main wheels for manually driving said main wheels independently of each other;
   a seat provided with a backrest and disposed in the rear region of said frame;
   a footrest disposed in the front region of said frame and being positioned in front of said seat with a predetermined space defined therebetween;
   a swiveled auxiliary wheel including an axle supported in the rear region of said frame; and
   a friction brake device comprising a brake shoe adapted to rub against a ground surface when said brake device is actuated.

2. A ridable amusement device as set forth in claim 1, wherein said main wheels are disposed on the inner side of said frame.

3. A ridable amusement device as set forth in claim 2, wherein said handles are attached respectively to said main wheels through crank arms and inwardly directed to face each other.

4. A ridable amusement device as set forth in claim 1, wherein the axles of said main wheels are disposed on a diameter of said annular frame.

5. A ridable amusement device as set forth in claim 1, wherein the backrest of said seat is secured directly to said frame and opposite ends of the seat are fixed to a crosspiece bridging said frame.

6. A ridable amusement device as set forth in claim 1, wherein the diameter of said auxiliary wheel is smaller than that of said main wheels.

7. A ridable amusement device as set forth in claim 1, wherein said frame is inclined in the direction from front to rear.

8. A ridable amusement device as set forth in claim 1, wherein said frame is formed of a pipe.

9. A ridable amusement device as set forth in claim 1, wherein said brake device is arranged so that it is capable of maintaining its brake action.

10. A ridable amusement device comprising:
    an annular frame;
    mutually independent rotatable main wheels disposed on opposite sides of said frame including axles which are aligned with each other;
    handles associated respectively with said main wheels for manually driving said main wheels independently of each other;
    a seat provided with a backrest and disposed in the rear region of said frame;
    a footrest disposed in the front region of said frame and being positioned in front of said seat with a predetermined space defined therebetween;
    a swiveled auxiliary wheel including an axle supported in the rear region of said frame; and
    a hemispherical roof projecting above said frame which covers at least said seat and which includes a longitudinally extending divisional plane which bisects the roof in halves which are pivoted on said frame for opening and closing.

11. A ridable amusement device as set forth in claim 10, wherein said roof is formed of a transparent material.

12. A ridable amusement device as set forth in claim 10, wherein said main wheels are disposed on the inner side of said frame.

13. A ridable amusement device as set forth in claim 12, wherein said handles are attached respectively to said main wheels through crank arms and inwardly directed to face each other.

14. A ridable amusement device as set forth in claim 10, wherein the axles of said main wheels are disposed on a diameter of said annular frame.

15. A ridable amusement device as set forth in claim 10, wherein the backrest of said seat is secured directly to said frame and opposite ends of the seat are fixed to a crosspiece bridging said frame.

16. A ridable amusement device as set forth in claim 10, wherein the diameter of said auxiliary wheel is smaller than that of said main wheels.

17. A ridable amusement device as set forth in claim 10, wherein said frame is inclined in the direction from front to rear.

18. A ridable amusement device as set forth in claim 10, wherein said frame is formed of a pipe.

19. A ridable amusement device as set forth in claim 10, including a brake device.

20. A ridable amusement device as set forth in claim 19, wherein said brake device is a friction brake comprising a brake shoe adapted to rub against a ground surface when said brake device is actuated.

21. A ridable amusement device as set forth in claim 19, wherein said brake device is arranged so that it is capable of maintaining its brake action.

22. A ridable amusement device comprising:
    an annular frame;
    mutually independent rotatable main wheels disposed on opposite sides of said frame including axles which are aligned with each other;
    handles associated respectively with said main wheels for manually driving said main wheels independently of each other;
    a seat provided with a backrest and disposed in the rear region of said frame;
    a footrest disposed in the front region of said frame and being positioned in front of said seat with a predetermined space defined therebetween;
    a swiveled auxiliary wheel including an axle supported in the rear region of said frame; and
    said predetermined space positioned between said footrest and said seat being an open space which permits access from any direction into the interior of said annular frame.

23. A ridable amusement device as set forth in claim 22, wherein said main wheels are disposed on the inner side of said frame.

24. A ridable amusement device as set forth in claim 23, wherein said handles are attached respectively to said main wheels through crank arms and inwardly directed to face each other.

25. A ridable amusement device as set forth in claim 22, wherein the axles of said main wheels are disposed on a diameter of said annular frame.

26. A ridable amusement device as set forth in claim 22, wherein the backrest of said seat is secured directly to said frame and opposite ends of the seat are fixed to a crosspiece bridging said frame.

27. A ridable amusement device as set forth in claim 22, wherein the diameter of said auxiliary wheel in smaller than that of said main wheels.

28. A ridable amusement device as set forth in claim 22, wherein said frame is inclined in the direction from front to rear.

29. A ridable amusement device as set forth in claim 22, wherein said frame is formed of a pipe.

30. A ridable amusement device as set forth in claim 22, including a brake device.

31. A ridable amusement device as set forth in claim 30, wherein said brake device is a friction brake comprising a brake shoe adapted to rub against a ground surface when said brake device is actuated.

32. A ridable amusement device as set forth in claim 30, wherein said brake device is arranged so that it is capable of maintaining its brake action.

33. A ridable amusement device as set forth in claim 22, including a roof which covers at least said seat.

34. A ridable amusement device as set forth in claim 33, wherein said roof is in the form of a hemisphere projecting above said frame.

35. A ridable amusement device as set forth in claim 34, wherein said roof is bisected by a longitudinally extending divisional plane and the roof halves are pivoted on said frame for opening and closing.

36. A ridable amusement device as set forth in claim 34, wherein said roof is formed of a transparent material.

* * * * *